R. R. ALLEN.
QUILTING FRAME.
APPLICATION FILED MAY 3, 1921.
1,390,857.
Patented Sept. 13, 1921.
2 SHEETS—SHEET 1.
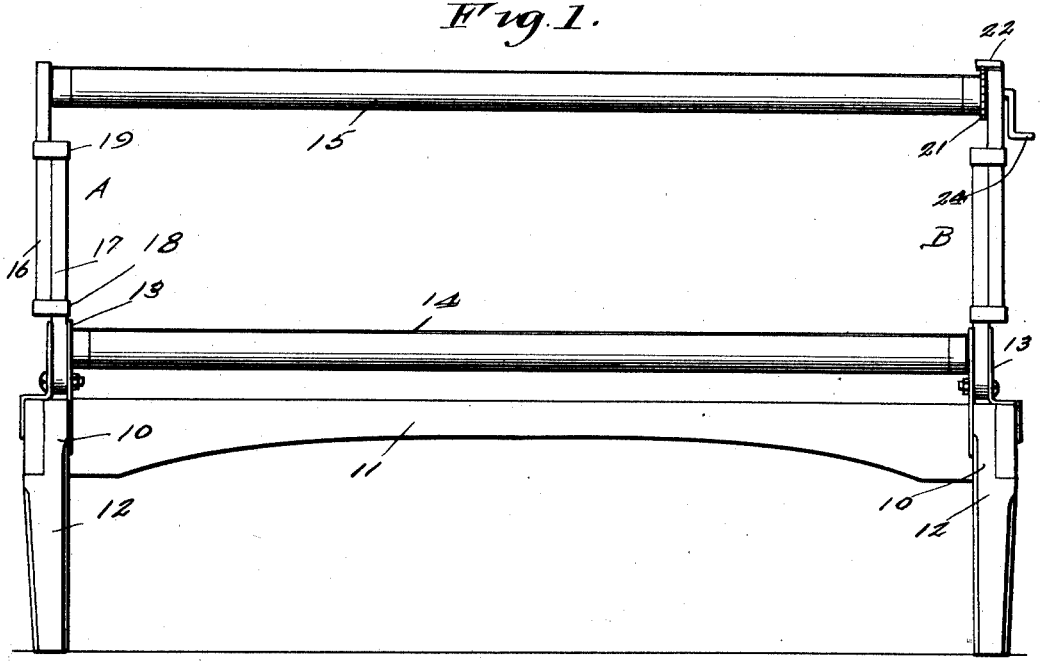
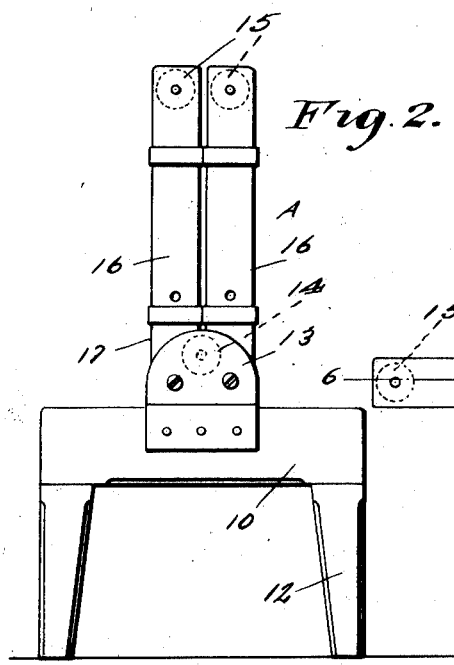
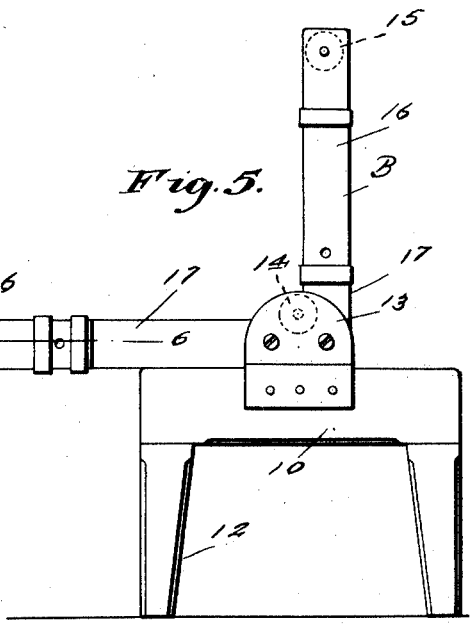
Rufus R. Allen, INVENTOR
BY Victor J. Evans ATTORNEY
WITNESSES R. R. ALLEN.
QUILTING FRAME.
APPLICATION FILED MAY 3, 1921.
1,390,857. Patented Sept. 13, 1921.
2 SHEETS—SHEET 2.
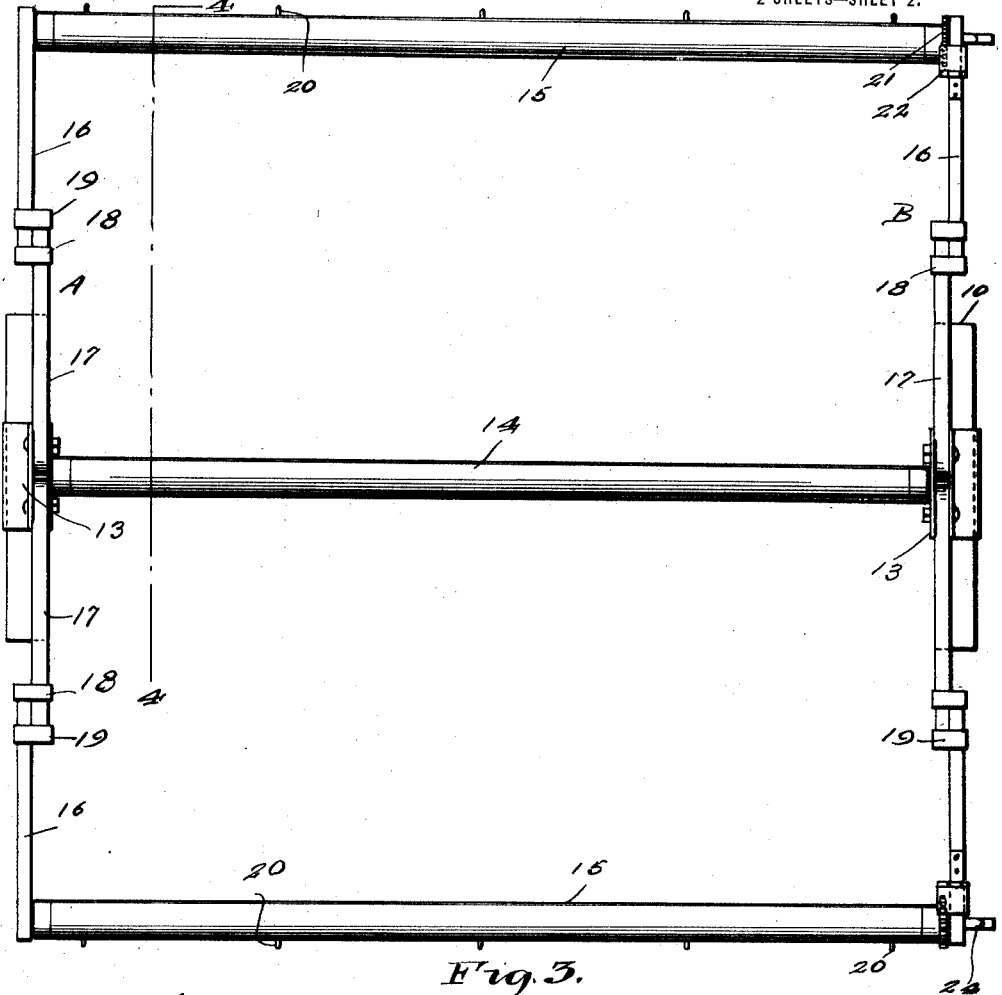
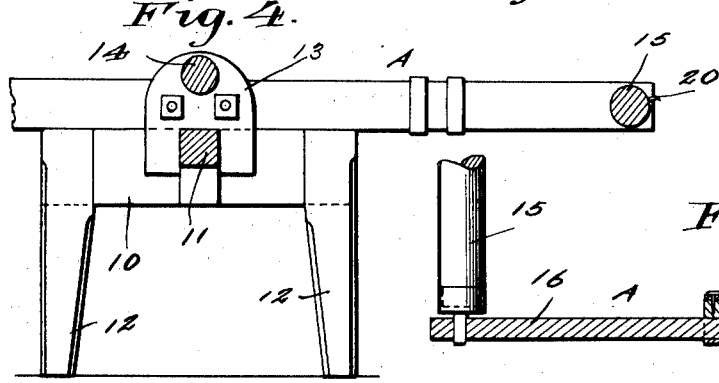
Rufus R. Allen INVENTOR

UNITED STATES PATENT OFFICE.

RUFUS R. ALLEN, OF CLARINDA, IOWA.

QUILTING-FRAME.

1,390,857.  Specification of Letters Patent.  Patented Sept. 13, 1921.

Application filed May 3, 1921. Serial No. 466,554.

*To all whom it may concern:*

Be it known that I, RUFUS R. ALLEN, a citizen of the United States, residing at Clarinda, in the county of Page and State of Iowa, have invented new and useful Improvements in Quilting-Frames, of which the following is a specification.

This invention comprehends the provision of a quilting frame which is susceptible of adjustment for different size quilts, and also to permit of its use in places where the floor space is limited.

More specifically stated, the frame forming the subject matter of the invention embodies a base upon which is pivoted what I term the end sections of the frame, each section being pivoted upon the base for independent movement so that the sections can be arranged horizontally, or perpendicularly as the occasion may require, the end sections being also constructed for adjustment to vary their width.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views and wherein:

Figure 1 is a side elevation of the quilting frame showing the latter folded.

Fig. 2 is an end elevation.

Fig. 3 is a top plan view of the frame with both end sections extended.

Fig. 4 is a sectional view taken on line 4—4 of Fig. 3.

Fig. 5 is a view showing one of the end sections of the frame arranged perpendicularly.

Fig. 6 is an enlarged detail sectional view taken on line 6—6 of Fig. 5.

The frame forming the subject matter of my invention embodies a base which consists of spaced end members 10 connected by means of a bar 11, the base being supported by legs 12 depending from the end member 10. The end members 10 are reinforced by metallic brackets 13, there being one of these brackets for each end member. Each bracket is suitably secured to the end member and projects a slight distance above the latter, while journaled between the brackets is a centrally disposed roller 14 arranged immediately above the bar 11. Pivoted within the brackets are the adjustable end sections A and B respectively.

Each of these sections consists of spaced parallel arms, which rotatably support a roller 15. Each arm includes adjustable sections 16 and 17 respectively, the corresponding sections 17 of each pair of arms being pivoted upon the brackets above referred to. Carried by the sections 16 are guides 18 to receive the slidable sections 17 of said arms, the latter mentioned sections also supporting guides 19 which are slidably mounted upon the sections 16 of said arms. By reason of this construction it will be manifest that when the end sections A and B are swung upon their pivots to assume a horizontal position, the rollers 15 can be moved toward or away from the intermediate roller so as to lengthen or shorten the frame as the occasion may require. The rollers 15 are equipped with pins 20 to secure the ends of the quilt to the rollers, while each roller carries a ratchet wheel 21 with which a pawl 22 coöperates to prevent retrograde movement of the roller. A crank handle 24 is also carried by each roller 15 so the latter can be conveniently rotated to tighten the quilt in the usual manner.

In practice, the end members A and B are swung upon their pivots to a horizontal position as illustrated in Fig. 3, and the quilt applied to the frame in the usual well-known manner. The rollers 15 are adjustable as above described to vary the length of the frame, the adjustable sections 16 and 17 of the parallel arms being fixed relatively in an adjusted position by means of the fastening elements 25. The rollers 15 can be rotated to strap the quilt when desired through the instrumentality of the crank handles 23. Should the floor space be limited so as to prohibit the use of the frame with both end sections extended, either section A or B can be swung to a perpendicular position as illustrated. When the frame is not in use, the end sections are collapsed to position the rollers 15 as close to the intermediate roller as possible, and both end sections A and B swung upon their pivots to assume the positions illustrated in Figs. 1 and 2.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

A quilting frame of the character described comprising a base, a roller journaled thereon, and sections pivoted upon the base, each section comprising spaced parallel arms, each arm being made up of slidably associated members, a roller journaled between the corresponding members of each pair of arms, whereby the rollers of the end sections may be moved toward and away from the first mentioned roller to vary the length of the frame, means for rotating the roller of each end section, and a pawl and ratchet for each of said rollers to prevent retrograde movement thereof.

In testimony whereof I affix my signature.

RUFUS R. ALLEN.